(12) United States Patent
Forster (10) Patent No.: US 9,341,545 B2
(45) Date of Patent: May 17, 2016

(54) TESTING CATALYTIC EFFICIENCY OF AN EXHAUST COMPONENT

(71) Applicant: Ceramex Ltd, Gainsborough Lincolnshire (GB)

(72) Inventor: Peter Ivan Forster, Gainsborough (GB)

(73) Assignee: Ceramex Ltd, Gainsborough Lincolnshire (GB)

( * ) Notice: Subject to any disclaimer, the term of this patent is extended or adjusted under 35 U.S.C. 154(b) by 0 days.

(21) Appl. No.: 14/654,082

(22) PCT Filed: Mar. 12, 2014

(86) PCT No.: PCT/IB2014/059671
§ 371 (c)(1),
(2) Date: Jun. 19, 2015

(87) PCT Pub. No.: WO2014/141088
PCT Pub. Date: Sep. 18, 2014

(65) Prior Publication Data
US 2016/0018289 A1    Jan. 21, 2016

(30) Foreign Application Priority Data

Mar. 12, 2013    (GB) .................................. 1304422.7

(51) Int. Cl.
*G01M 15/10* (2006.01)
*F01N 11/00* (2006.01)
*F01N 3/023* (2006.01)

(52) U.S. Cl.
CPC ........... *G01M 15/102* (2013.01); *F01N 3/0237* (2013.01); *F01N 11/00* (2013.01); *F01N 2550/02* (2013.01); *Y02T 10/47* (2013.01)

(58) Field of Classification Search
CPC .................................................... G01M 15/10

USPC ............... 73/114.69, 114.75, 114.77, 116.01, 73/116.04
See application file for complete search history.

(56) References Cited

U.S. PATENT DOCUMENTS 3,431,077 A    3/1969    Danforth
3,536,452 A    10/1970    Norton et al.
(Continued)

FOREIGN PATENT DOCUMENTS

DE    69717743 T2    5/2003
EP    0626507 A1    11/1994
(Continued)

OTHER PUBLICATIONS

Written Opinion and International Search Report for PCT App. No. PCT/IB2014/059671, published as WO 2014/141088 on Sep. 18, 2014.

*Primary Examiner* — Eric S McCall
(74) *Attorney, Agent, or Firm* — D. Peter Hochberg; Sean F. Mellino (57) ABSTRACT

The present invention relates to an apparatus and method for testing the catalytic efficiency of exhaust components, particularly exhaust components used in heavy-duty diesel engine exhaust systems. The exhaust component typically has a plurality of elongate channels through which exhaust gases flow, the channels extending between a first end face and a second end face of the exhaust component. The method comprises causing an exhaust gas to flow through the exhaust component, and making measurements of a property of the exhaust gas before and after it has flowed through the exhaust component, wherein the flow of the exhaust gas through the channels is restricted such that the volume of the exhaust component through which the exhaust gas flows is reduced.

14 Claims, 11 Drawing Sheets

(56) References Cited

U.S. PATENT DOCUMENTS

| | | | |
|---|---|---|---|
| 3,583,230 A | 6/1971 | Patterson | |
| 4,099,923 A | 7/1978 | Milberger | |
| 4,221,568 A | 9/1980 | Boettger | |
| 5,398,541 A | 3/1995 | Hijikata | |
| 5,431,043 A | 7/1995 | Gugel | |
| 5,860,277 A | 1/1999 | Schnaibel | |
| 5,959,297 A | 9/1999 | Weinberg et al. | |
| 6,063,633 A | 5/2000 | Willson, III | |
| 6,090,172 A | 7/2000 | Dementhon | |
| 6,238,929 B1 | 5/2001 | Antonenko et al. | |
| 6,333,196 B1 | 12/2001 | Willson, III | |
| 6,401,450 B1 * | 6/2002 | Hoshi | F01N 3/0835 60/274 |
| 6,426,226 B1 | 7/2002 | Senkan | |
| 6,576,470 B1 | 6/2003 | Windhab et al. | |
| 6,864,091 B1 | 3/2005 | Wang et al. | |
| 7,052,914 B2 | 5/2006 | Maier et al. | |
| 7,326,265 B2 | 2/2008 | Zilliox | |
| 7,435,598 B2 | 10/2008 | Vaughn et al. | |
| 7,635,593 B2 | 12/2009 | Muzio et al. | |
| 8,069,712 B2 | 12/2011 | Frauhammer | |
| 8,273,185 B2 | 9/2012 | Milles | |
| 8,418,684 B2 | 4/2013 | Robinson, Jr. | |
| 9,068,954 B1 | 6/2015 | Robinson, Jr. et al. | |
| 2002/0182128 A1 | 12/2002 | Carnahan et al. | |
| 2004/0255655 A1 * | 12/2004 | Busch | F01N 3/20 73/114.77 |
| 2006/0144223 A1 | 7/2006 | Sellers | |
| 2006/0246593 A1 | 11/2006 | Towler | |
| 2007/0294997 A1 | 12/2007 | Lavy | |
| 2008/0178413 A1 | 7/2008 | Wagner | |
| 2008/0295690 A1 | 12/2008 | Ehlers | |
| 2009/0056288 A1 | 3/2009 | Waldo | |
| 2011/0056280 A1 | 3/2011 | Votsmeier | |
| 2012/0111370 A1 * | 5/2012 | Milles | B01D 41/04 134/22.18 |
| 2012/0252130 A1 | 10/2012 | Webb | |
| 2013/0181134 A1 * | 7/2013 | Forster | F01N 3/0222 250/341.6 |
| 2013/0263577 A1 | 10/2013 | Anilovich | |
| 2013/0276427 A1 | 10/2013 | Doering | |

FOREIGN PATENT DOCUMENTS

| | | |
|---|---|---|
| EP | 1698765 A1 | 9/2006 |
| EP | 1778956 B1 | 9/2009 |
| GB | 1407740 A | 9/1975 |
| WO | 2012109691 A1 | 8/2012 |
| WO | 2013050167 A1 | 4/2013 |

* cited by examiner

- Stage 1 – DPF heated up – no test gas injection – then temperature steady
- Stage 2 – Gas injected at 10l/min
- Stage 3 – Gas off

FIG. 13

TESTING CATALYTIC EFFICIENCY OF AN EXHAUST COMPONENT

CROSS-REFERENCE TO RELATED APPLICATIONS

This application is a National Stage application of International Application No. PCT/IB2014/059671 filed on Mar. 12, 2014, which claims priority of GB application Serial Number 1304422.7 filed on Mar. 12, 2013, both of which are incorporated herein by reference in their entireties.

BACKGROUND a. Field of the Invention

The present invention relates to an apparatus and method for testing exhaust components. In particular the invention relates to an apparatus and method for testing the catalytic efficiency of exhaust components used in heavy-duty diesel engine exhaust systems.

b. Related Art

Modern exhaust after-treatment systems for diesel engines are becoming increasingly sophisticated. Typically, these systems consist of various components that are designed to reduce the amount of potentially harmful pollutants present in the exhaust gases. These pollutants include oxides of nitrogen such as nitrogen oxide (NO) and nitrogen dioxide ($NO_2$) known collectively as 'NOx', carbon monoxide (CO), unburnt fuel or hydrocarbons and particulate matter.

In order to reduce or eliminate these pollutants, after-treatment systems typically contain the following components:
(i) A Diesel Oxidation Catalyst (DOC) to convert carbon monoxide to carbon dioxide ($CO_2$) and unburnt fuel to water and $CO_2$;
(ii) Diesel Particulate Filters (DPF) to reduce the amount of particulate matter, in particular soot and ash;
(iii) Selective Catalytic Reduction Catalysts (SCRC) to reduce NOx levels by converting NO and $NO_2$ to nitrogen; and
(iv) Ammonia Slip Catalysts (ASC) to remove excess ammonia, which is injected into the exhaust system in the form of urea as part of the Selective Catalytic Reduction process.

The diesel particulate filters are typically wall flow filters which comprise a cylindrical ceramic monolith core (or another type of monolith) contained within a cylindrical metal surround or sleeve. The overall diameter of a filter for a vehicle exhaust system is generally between 200 and 400 mm. The ceramic filter cores have a number of elongate channels running along their length. These channels generally have an approximately square cross-section and are 1-2 mm in width. Between the channels the walls of the filter core are formed from a porous ceramic material. Neighbouring channels in the filter are plugged at alternate ends with ceramic material so that exhaust gases entering a channel at one end cannot exit the same channel at its other end. To exit, the gas must pass from one channel to the next through the porous walls of the filter. In doing so, soot and ash within the gas are deposited within and on the walls of the filter. The metal sleeve of the filter includes flanges at each end which, when in use, aid the connection of the filter to other parts of a vehicle's exhaust system.

The walls of the diesel particulate filters are typically coated with a catalyst washcoat in order to facilitate the process of regeneration, in which the soot deposits in the filter are periodically burnt away or oxidised from the filter. By contrast, the ash deposits continue to accumulate, since ash is non-combustible, and the diesel particulate filters, therefore, require periodic cleaning. Various known methods are used to clean the diesel particulate filters including air jets, compressed-air pulses and water-based processes.

In light-duty diesel engine applications (including cars, vans and other small vehicles), the ash accumulation process is relatively slow, and frequent cleaning of the diesel particulate filter is not required. However, in heavy-duty applications (such as in trucks, buses, excavators, tractors and the like) the use of the engine is much more intensive and diesel particulate filter cleaning is required on a regular basis, typically every 1 or 2 years depending on usage.

If the diesel particulate filter is removed from the vehicle for cleaning, various methods are used to ensure that the filter is in good condition before it is re-fitted to the vehicle. These include airflow tests and other inspection techniques. In addition to these physical tests, it is also desirable to measure the catalytic efficiency of the diesel particulate filter to ensure it is in satisfactory condition. The standard method for testing catalytic efficiency of a diesel particulate filter when it has been removed from the vehicle is to pass the exhaust gas from a stationary diesel engine through the filter and measure the levels of the relevant chemical components of the gas before and after the filter. An alternative to a stationary engine is a vehicle dynamometer arrangement in which the particulate filter is attached to a stationary test vehicle on a rolling-road device. U.S. Pat. No. 5,431,043 describes a method for testing the catalytic activity of a catalytic converter in an engine exhaust which involves running the engine to heat the converter to a normal operating temperature. Once the converter has reached the desired temperature the engine is shut off and the fuel and ignition systems of the engine are disabled and a source of hydrocarbon is introduced at a location upstream of the converter such as the air induction system. The engine is then cranked to pump the hydrocarbon through the system where it is mixed with air and to the converter. The exhausted constituents are analyzed and the activity of the converter is determined based on the levels thereof.

All of the methods use apparatus that is designed to mimic the use of the particulate filter in the vehicle exhaust system, but also permit the use of static exhaust gas analysers in a specially-equipped testing facility.

An important feature of these test methods is the speed of flow of exhaust gases through the test particulate filter. In order to make an accurate assessment of the catalytic activity of the filter, it is necessary to use a meaningful gas flow rate, substantially the same as the typical flow rates that would be experienced by the filter in use on the vehicle. Large diesel engines can produce in excess of 1 $m^3$ of exhaust gas per second. The gas flow rate through the filter is typically measured in the form of a 'space velocity', which is related to the number of volume displacements through the filter in a given time. For example, a typical space velocity for a heavy duty vehicle may be in the region of 50,000-250,000 (volume displacements) per hour. This assumes a 20 liter filter can handle 1 cubic meter/sec; i.e. 50 changes/sec or 3000 changes per min or 180,000 changes per hour.

In order to replicate these space velocities during the testing of particulate filters used in heavy-duty applications, it is necessary to use a heavy-duty engine with a large capacity. However, the use of a large engine of this type means that typical testing facilities are complex and expensive, both in terms of installation and operating costs. There are also a number of other problems associated with traditional testing methods. Firstly, filters of different sizes and shapes require special adaptors to allow them to be connected securely into the exhaust line of the test engine. Secondly, the duration of the testing process is fairly long, owing to the time taken for the filter to reach the necessary temperatures to measure catalytic efficiency. These temperatures are typically in excess of 250° C. and the materials of the core of the filters generally have a large heat capacity and, therefore, can take a relatively long time to reach thermal equilibrium. Finally, the removal of the filter after testing is difficult because it is hot, usually in excess of 300° C., owing to the heat from the exhaust gases.

As a result, testing of catalytic activity is generally restricted to specialised development programs for new engines or exhaust systems, rather than the routine assessment of used parts.

It will be appreciated that although the foregoing description discussed testing of particulate filters, the same or similar methods are also commonly employed for testing other exhaust components such as DOCs, SCRCs and ASCs. As such, references in the following description to an exhaust component will be understood to include a number of different after-treatment systems including DPFs, DOCs, SCRCs and ASCs.

The object of this invention is, therefore, to provide an apparatus and method for testing exhaust components, which improves the speed, efficiency and cost of catalytic efficiency testing.

SUMMARY OF THE INVENTION

According to a first aspect of the present invention there is provided a method of testing the catalytic efficiency of an exhaust component, the exhaust component having a plurality of elongate channels extending between first and second ends through which exhaust gases flow, and the method comprising:
  causing an exhaust gas to flow through the exhaust component; and
  making measurements of a property of the exhaust gas before and after it has flowed through said exhaust component;
  wherein the flow of the exhaust gas through the channels is restricted such that the volume of the exhaust component through which the exhaust gas flows is reduced.

According to a second aspect of the present invention there is provided an apparatus for use in testing the catalytic efficiency of an exhaust component, the exhaust component having a plurality of elongate channels through which exhaust gases flow, said channels extending between a first end face and a second end face of said component, and the apparatus comprising:
  a first clamping means and a second clamping means, each of said first and second clamping means comprising a sealing plate including an aperture for receiving an end of a conduit through which exhaust gas is conveyed; and
  means for urging the first and second clamping means into a clamping position in which the sealing plate of the first clamping means is in contact with said first end face of the exhaust component and the sealing plate of the second clamping means is in contact with said second end face of the exhaust component, such that the apertures in the first and second sealing plates are aligned, thereby defining a gas flow path through said exhaust component between said apertures.

Preferably the volume of the exhaust component through which the exhaust gas flows is less than 50%, particularly preferably between 15% and 30%.

By restricting the flow of exhaust gas through only a portion of the exhaust component, the rate of heating of the exhaust component is increased compared to methods in which the exhaust gas flows through the entirety of the exhaust component. This enables the catalyst test temperature to be reached more rapidly, thereby significantly reducing the time necessary for testing of the exhaust component.

Furthermore, because the exhaust gases only flow through a portion of the exhaust component, it is possible to use a smaller engine to produce the exhaust gases at the required, representative space velocities, even when testing a large capacity, heavy-duty exhaust component. This reduces the capital cost of the testing apparatus, as well as the running costs due to the reduced fuel consumption.

Although the test method of the present invention restricts the flow of exhaust gas through only a portion of the exhaust component, we have found that the results are representative of the catalytic efficiency of the entire exhaust component due to the uniformity of the internal structure of the exhaust component.

Advantageously, in some embodiments, the volume of the exhaust component through which the gas flows is centrally located such that gas does not flow through a peripheral region of the exhaust component. In these embodiments, because the peripheral region of the exhaust component is not heated by the exhaust gases, the exterior surfaces of the exhaust component remain close to ambient temperatures, and the exhaust component can be handled more easily after testing.

Preferably the method comprises applying a first sealing means to said first end face of the exhaust component and a second sealing means to said second end face of the exhaust component, such that said first and second sealing means create a gas-tight seal and prevent exhaust gas flowing through a plurality of the channels of the exhaust component. In particularly preferred embodiments the first sealing means comprises a first sealing plate and the second sealing means comprises a second sealing plate, and the method further comprises clamping the exhaust component between said first and second sealing plates.

The use of sealing plates, therefore, provides an improved clamping arrangement compared to prior art methods. The sealing plates directly contact the end faces of the exhaust component, thereby clamping the exhaust component between them. Special adaptors are, therefore, not required to connect the exhaust component into the test exhaust line because in the test method of the present invention it is not necessary to pass exhaust gas through the entirety of the exhaust component, and as such the overall shape and size of the exhaust component does not need to be considered.

BRIEF DESCRIPTION OF THE DRAWINGS

The invention will now be further described by way of example only and with reference to the accompanying drawings, in which.

DETAILED DESCRIPTION

Figure 1:
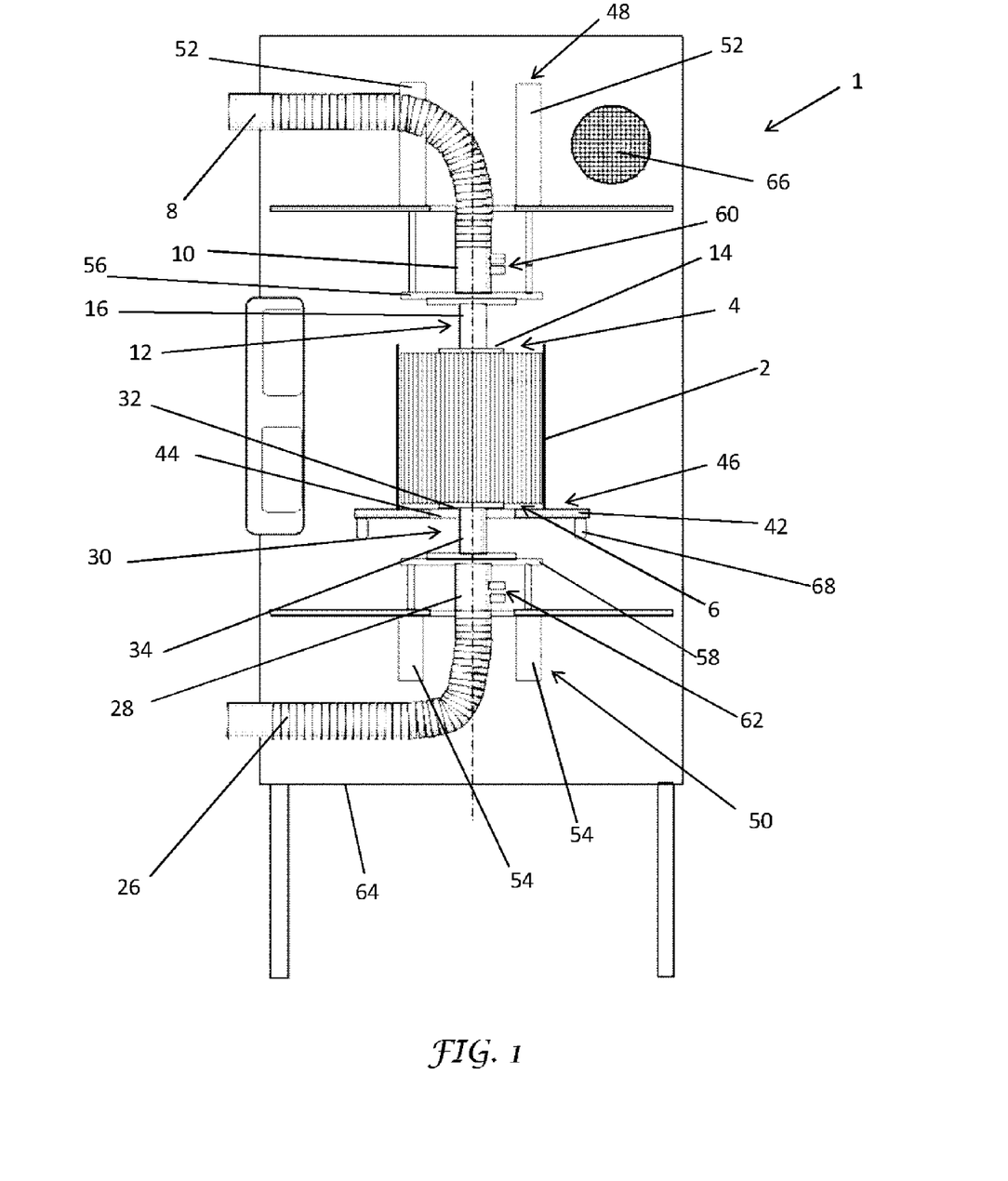
FIG. 1 shows a test cell for use in testing the catalytic efficiency of an exhaust component according to a preferred embodiment of the present invention.

FIG. 1 shows a test cell 1 for testing the catalytic efficiency of an exhaust component 2 such as a diesel particulate filter. The test cell 1 comprises an inlet gas flow path conveying exhaust gas to a first end face 4 of the exhaust component 2 and an outlet gas flow path conveying the exhaust gas from a second end face 6 of the exhaust component 2, after having passed through the exhaust component 2. The exhaust gas is preferably exhaust gas from a diesel engine, but may, alternatively, be any hot air or gas stream comprising a material which is acted upon by a catalyst in the exhaust component, for example nitrogen oxides (NOx), carbon monoxide or hydrocarbons.

During testing, measurements of the levels of the selected test gases and temperature of the exhaust gas are made before and after the gas passes through the exhaust component 2 in order to determine the catalytic efficiency of the component 2. For example, the catalytic efficiency of a typical exhaust component 2 may be given by the following equation:

$$\text{Efficiency} = \frac{NO_2(\text{after}) - NO_2(\text{before})}{NO(\text{before})}$$

The exhaust component 2 comprises a gas flow portion or core 3 including a plurality of channels extending between the first end face 4 and the second end face 6 and a surround or casing 5 partially surrounding the core 3. When the exhaust component 2 is installed in a vehicle, exhaust gases from the vehicle's engine flow through the entirety of the core 3 from the first end face 4 to the second end face 6. In this example the exhaust component 2 is cylindrical, the casing 5 is tubular and the first and second end faces 4, 6 of the core 3 are circular. A first end 7 of the tubular casing 5 extends beyond the first end face 4 of the core 3 and a second end 9 of the tubular housing 5 extends beyond the second end face of the core 3, thereby forming flanges 7, 9 of the exhaust component 2. Typically the core 3 is made of a ceramic material and the casing 5 is made of metal.

The test cell 1 comprises an inlet exhaust gas conduit 8 which is connectable at a first end to an exhaust of an engine or other suitable source of hot test gas and is connected at a second end 10 to a first clamping means 12. The first clamping means 12 comprises a first sealing plate 14 for forming a gas-tight seal against the first end face 4 of the exhaust component 2 and an inlet pipe 16.

Figure 2:
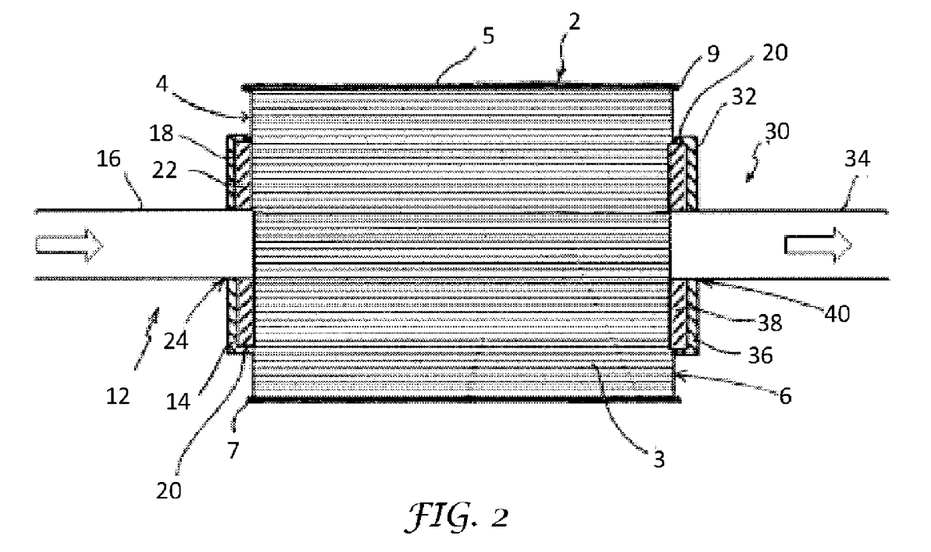
FIG. 2 shows sealing plates of the test cell of FIG. 1 in contact with end faces of an exhaust component.

As shown most clearly in FIG. 2, the sealing plate 14 comprises a support plate 18 having a rim 20 extending around the periphery. A sealing layer 22 is provided on one face of the support plate 18. The sealing layer 22 is made of a heat-resistant material which forms a gas-tight seal when the sealing plate 14 is pressed against the end face 4 of the exhaust component 2. In a preferred embodiment the sealing layer 22 is made of a ceramic felt material.

The sealing plate 14 has a central aperture 24 into which an end of the inlet pipe 16 is inserted. In this way, the sealing plate 14 forms a sealing flange around the end of the inlet pipe 16, and the inlet pipe provides a passage for gas flow between the second end 10 of the inlet conduit 8 and the first end face 4 of the exhaust component 2.

The test cell 1 further comprises an outlet exhaust gas conduit 26 which is connected at a first end 28 to a second clamping means 30. A second end of the outlet conduit 26 is arranged to allow the venting of exhaust gas to atmosphere.

The second clamping means 30 is substantially identical to the first clamping means 12 and comprises a second sealing plate 32 for forming a gas-tight seal against the second end face 6 of the exhaust component 2 and an outlet pipe 34 providing a passage for gas flow between the second end face 6 and the first end 28 of the outlet conduit 26.

The sealing plate 32 comprises a support plate 36 on which a sealing layer 38 is provided, as described in relation to the first sealing plate 14. The sealing layer 38 is made of a heat-resistant material which forms a gas-tight seal when the sealing plate 32 is pressed against the end face 6 of the exhaust component 2. In a preferred embodiment the sealing layer 38 is made of a ceramic felt material. The sealing plate 32 has a central aperture 40 into which an end of the outlet pipe 34 is inserted. In this way, the sealing plate 32 forms a sealing flange around the end of the outlet pipe 34.

The exhaust component 2 to be tested is supported in the test cell 1 on a support platform 42 located between the first and second clamping means 12, 30. The support platform 42 has a central opening 44 through which the second sealing plate 32 can pass, as described further below. In use, the exhaust component 2 is placed on the platform 42 with the second end 9 of the casing 5 in contact with an upper surface 46 of the platform 42 and the opening 44 aligned with at least a part of the second end face 6. In a preferred embodiment the opening 44 is aligned with a central portion of the second end face 6.

The test cell 1 further comprises first and second actuating means 48, 50, arranged and adapted for relative movement towards or away from each other. In this embodiment the first actuating means 48 is arranged to move the first clamping means 12 between a first, disengaged position in which the first clamping means 12 is held at a distance from the first end face 4 of the exhaust component 2, and a second, engaged or clamping position in which the first clamping means 12 is in contact with the first end face 4 of the exhaust component 2. The second actuating means 50 is, similarly, arranged to move the second clamping means 30 between a first, disengaged position in which the second clamping means 30 is held at a distance from the second end face 6 of the exhaust component 2, and a second, engaged or clamping position in which the second clamping means 30 is in contact with the second end face 6 of the exhaust component 2. In the disengaged position the second clamping means 30 is located below the support platform 42. When the second clamping means 30 is moved to the engaged position, the sealing plate 32 passes up through the opening 44 in the support platform 42 to contact the second end face 6.

In this embodiment each of the actuating means 48, 50 comprises a pair of pneumatic cylinders 52, 54. A free end of each of the pneumatic cylinders 52, 54 is connected to a respective actuating member 56, 58 which is, in turn, attached to the first or second clamping means 12, 30 to permit movement of the clamping means 12, 30 between the disengaged and engaged positions upon activation of the cylinders 52, 54. It will be appreciated that in other embodiments any suitable actuating means may be used, and the movement of the first and second clamping means 12, 30 between the disengaged and engaged positions may not be a purely linear movement as described here.

Inlet sensors 60 are located at the second end 10 of the inlet conduit 8 and outlet sensors 62 are located at the first end 28 of the outlet conduit 26. These sensors 60, 62 detect physical and chemical properties of the exhaust gas before and after it has passed through the exhaust component 2. The inlet and outlet sensors 60, 62 may comprise temperature sensors, NOx sensors, CO and $CO_2$ sensors, hydrocarbon sensors and pressure sensors.

The clamping means 12, 30, actuating means 48, 50 and support platform 42 are housed within a housing or frame 64, as shown in FIG. 1. In a preferred embodiment the housing 64 is an enclosed chamber provided with an extractor fan 66.

In order to be able to load and remove exhaust components 2 quickly, the support platform 42 is arranged to slide into and out of the housing 64. In this way, in use, the platform 42 may be slid out of the housing 64, an exhaust component 2 to be tested may be placed on the platform 42, and then the platform 42 may be slid back into the housing 64. In this example the support platform 42 is mounted on rollers 68.

Figure 3:
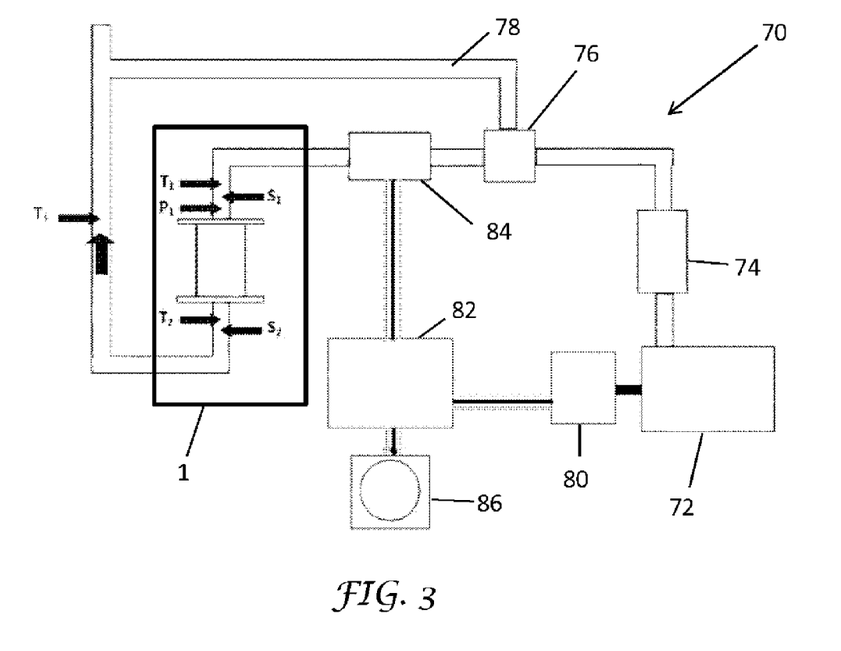
FIG. 3 is a schematic diagram of a test system including a test cell according to a preferred embodiment of the present invention.

FIG. 3 shows a test system 70 incorporating the test cell 1 described above. The system 70 comprises a source 72 of exhaust gas which in this example is a diesel engine 72. The diesel engine 72 is preferably turbocharged with an output power of approximately 40 kW and producing about 100 liters per second of exhaust gas at a constant 1500 rpm. In other embodiments the source 72 of exhaust gas may be an alternative source of hot gas, such as a gas burner, or a heated flow of air to which nitrogen oxide gas or another material which is acted upon by the catalyst is added.

The exhaust gas from the engine 72 passes through a particulate filter 74, which filters particulate carbon from the exhaust gas stream to prevent a build up of carbon on the exhaust component 2 being tested. The particulate filter 74 is preferably a large capacity filter so as to minimise the back-pressure at the engine 72. The exhaust gas may alternatively comprise a source of hot gas, such as a stream of hot air, into which is injected a test gas.

The filtered exhaust gas then flows through a flow control valve 76 before entering the test cell 1 via the inlet conduit 8. Preferably, all of the conduits linking the engine 72 to the inlet conduit 8 of the test cell 1, and through which the exhaust gas flows, are thermally insulated to minimise loss of heat energy from the exhaust gas. Once the exhaust gas has passed through the exhaust component 2, the exhaust gas flows through the outlet conduit 26 and is vented to atmosphere.

The flow control valve 76 is used to control the flow rate of the exhaust gas entering the exhaust component 2, thereby controlling the space velocity at which the testing is carried out. The control valve 76 can also be used to divert the flow of exhaust gas through a bypass passage 78, to bypass the test cell 1 and vent the exhaust gas directly to atmosphere. The exhaust gas may be diverted, in particular, during changing of the exhaust component 2 so that exhaust gas is not continuously emitted from the end of the inlet conduit 8 and so that the engine 72 does not have to be stopped each time the exhaust component 2 is changed.

The engine 72 is also arranged to drive a generator 80. Typically this is a 3-phase generator capable of producing about 35 kW at 400 V and 50 Hz. The electrical output of the generator 80 is provided to a load balancing means 82, which maintains the engine 72 under constant load by balancing the electrical output of the generator 80 between a heater 84 and a load bank 86.

The load bank 86 may be any balanced 3-phase load, such as electrical heating elements or cooling fans, capable of dissipating the full electrical energy output of the generator 80.

The heater 84 is situated between the flow control valve 76 and the inlet conduit 8 of the test cell 1. The heater 84 is used to rapidly heat and control the temperature of the exhaust gas at the inlet to the test cell 1. Applying additional heat energy to the exhaust gas in this way allows the exhaust component 2 to reach the necessary catalytic operating temperature much more quickly than relying on the heating effect of the exhaust gases alone. The heater 84 is preferably a 3-phase duct heater with a typical electrical power rating of approximately 20 kW.

In other embodiments the heater or other suitable heating elements may be used to heat the exhaust component 2 directly.

A method of testing catalytic efficiency will now be described with particular reference to a wall flow diesel particulate filter.

The particulate filter 2 is placed on the support surface 42 so that a central region of the second end face 6 is aligned with the opening 44. The pneumatic cylinders 52, 54 are then activated to move the first and second clamping means 12, 30 into the engaged position. Typically the first clamping means 12 is moved to the engaged position before the second clamping means 30 so that the filter 2 remains seated on the support platform 42. In this position the particulate filter 2 is clamped between the first and second sealing plates 14, 32 and supported by the support surface 42. Because the sealing plates 14, 32 contact the end faces 4, 6 of the particulate filter 2 directly, and do not need to precisely match the dimensions of the filter 2, the clamping of the particulate filter 2 into the test cell 1 is easier than in prior art systems.

In the clamped position, the first and second sealing plates 14, 32 are positioned such that the apertures 24, 40 are aligned at opposing ends of the filter 2 along an axis of the filter 2. Each sealing layer 22, 38 covers and seals a plurality of the channels surrounding the aperture 24, 40 at a respective end face 4, 6. Preferably the dimensions of the sealing layer 22, 38 are such that the sealing layer 22, 38 extends outwards over a distance that covers at least 20 channels. A gas flow path through the filter 2 is, thereby, defined between the apertures 24, 40 that is restricted to only a fraction of the total number of channels in the filter 2 and is, therefore, restricted to only a portion of the volume of the filter 2. The volume of the gas flow path may be varied by selecting sealing plates 14, 32 having apertures 24, 40 of different sizes such that fewer or more channels are exposed to the exhaust gas stream. The sealing plates 14, 32 are selected such that the volume of the gas flow path is less than 50% of the volume of the filter 2, more preferably between 15% and 30% of the volume of the filter 2, and most preferably about 20% of the volume of the filter 2.

Once the particulate filter 2 has been clamped between the sealing plates 14, 32, the flow control valve 76 is positioned so that exhaust gas flows from the engine 72 to the test cell 1. Exhaust gas flows through the inlet conduit 8, through the inlet pipe 16 and into a portion of the first end of the particulate filter 2 defined by the aperture 24. Because the volume of the gas flow path through the filter 2 is smaller than in traditional test methods, the particulate filter 2 is able more rapidly to reach the catalytic test temperature. The time taken to reach the test temperature may be reduced further by pre-heating the exhaust gas by passing the exhaust gas stream through a heater 84 before it enters the test cell 1, as described above.

Once the particulate filter 2 has reached thermal equilibrium at the desired operating temperature, test measurements are made using the inlet and outlet sensors 60, 62 and, typically, test results are obtained within about 5 minutes.

Once testing is completed, the flow control valve 76 is positioned to divert the exhaust gas stream to atmosphere, and the first and second clamping means 12, 30 are disengaged from the particulate filter 2. The filter 2 is then removed from the test cell 1. This removal of the filter 2 does not require any specialist means because the limited volume of the gas flow path and the short test times mean that the casing 5 of the particulate filter 2 remains at ambient temperature. Typically the filter 2 can be removed and replaced by another filter within one or two minutes.

The gas flow rate through the system may be measured with a suitable device (pitot tube) fitted in the exhaust duct at the position T3. Besides being required to ensure that gas passed through the test volume at the required flow rate or space velocity, the measurement may be used in conjunction with pressure measurement P1 to provide flow/backpressure data.

Figure 4:
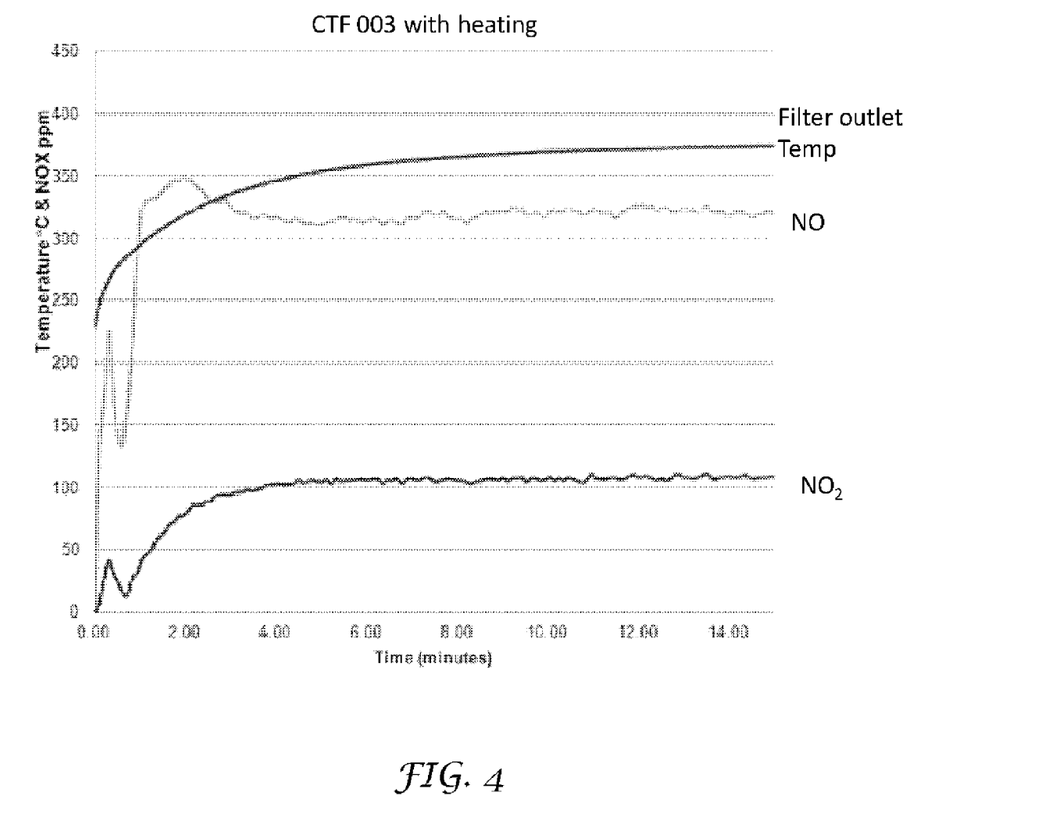
FIGS. 4 to 6 are graphs showing measurements and/or calculations made using results for filters in the test cell of FIG. 1.
Figure 5:
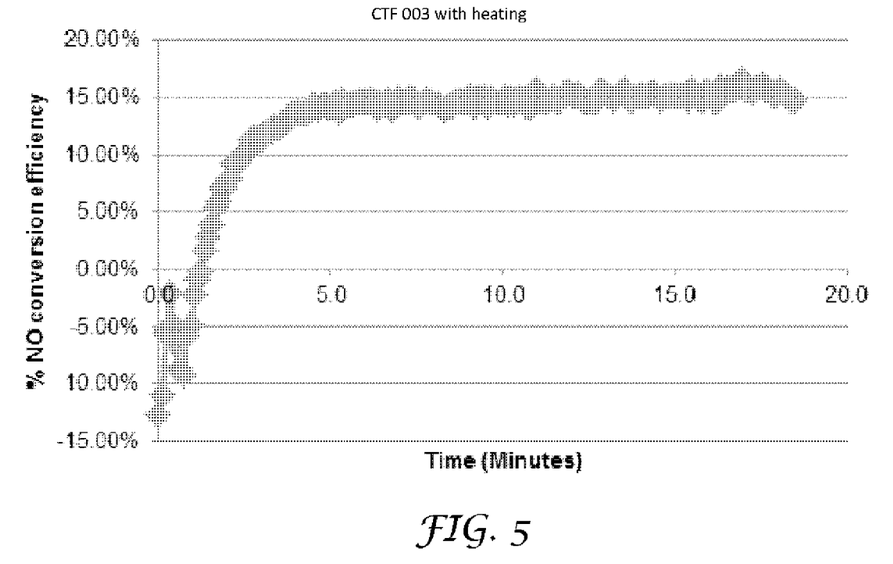
Figure 6:
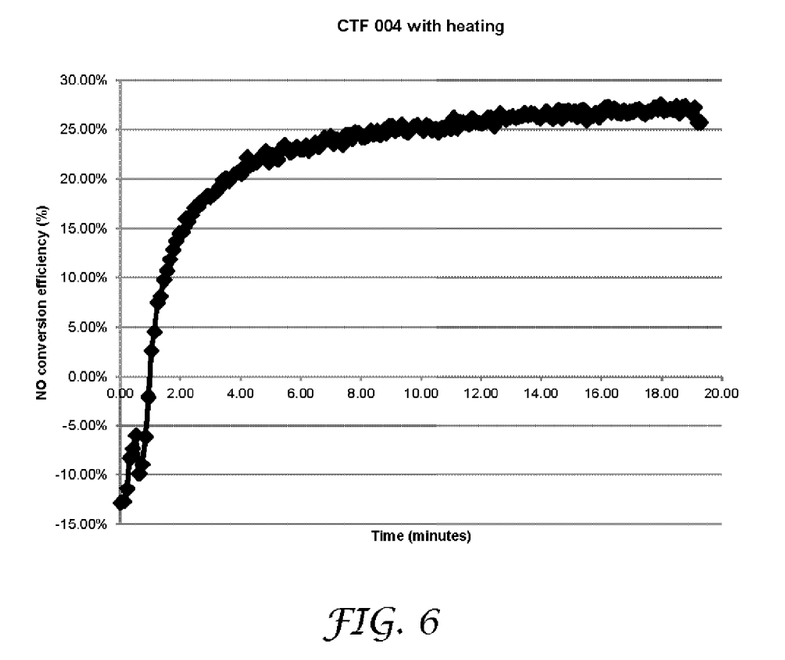

Results for a used filter (CTF 03) are shown in FIG. 4. The filter reaches a stable temperature of 300° C. or more in less than four minutes using heated exhaust gas, and stable values for NO and $NO_2$ concentration are achieved within five minutes. High flow rates were achieved (space velocity 50,000 per hour) over the test area despite using a small engine. The high flow rate facilitates obtaining a proper measurement of catalytic activity. As shown in FIGS. 5 and 6 (for, respectively, a used filter and a new filter) a measured 15% NO conversion efficiency is achieved for the used filter and a 25% NO conversion efficiency is found for a new filter after five cleaning cycles. This latter result suggests that repeated cleaning cycles do not damage catalytic efficiency. These results have been calibrated with results for an engine test bench using standard methods and found to have a high degree of correlation, confirming that the present method gives results that are representative of catalytic efficiency but quicker and more cost-effective.

The cost, speed and accuracy of the testing method described above allows it to be used as a routine quality control test for assessing large numbers of exhaust components.

Figure 7:
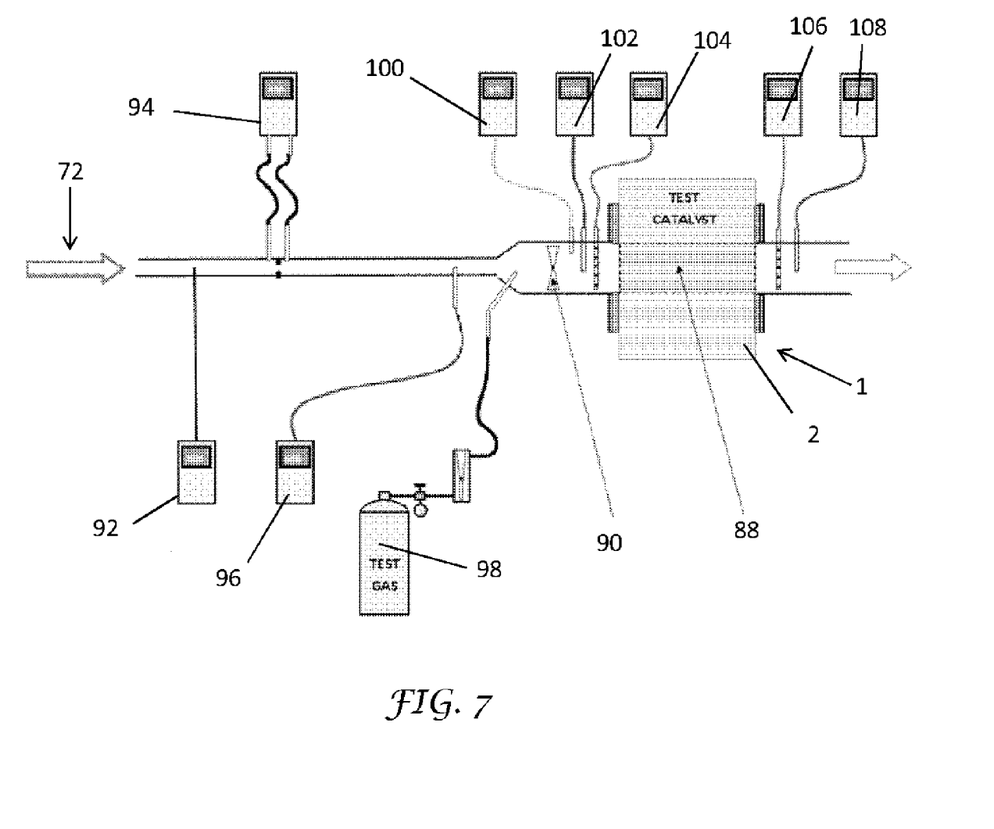
FIG. 7 shows a test cell in accordance with another embodiment of the present invention.

Turning now to FIG. 7, an alternative embodiment of a test cell 1 is shown. In this embodiment, the exhaust gas which passes through the restricted test volume 88 of the exhaust component 2 is made up from a hot gas stream 72 to which is added a test gas 98 via a mixing valve 90. The test gas may be any material which is acted upon by a catalyst in the exhaust component 2. Examples are nitric oxide (NO), carbon monoxide (CO) or a hydrocarbon, for example methane, ethane, propane or butane. The gas stream may be hot air, from any convenient source. In this embodiment, catalytic efficiency of the exhaust component 2 may be tested within 10 minutes at low cost and without the use of an engine to create the exhaust gas. In the present example, incoming gas flow is measured by a flow sensor 94 and controlled by a controller 92. Gas temperature is measured by a temperature sensor 96, and back pressure is measured by a pressure gauge 100. Inlet and outlet temperatures for the exhaust component 2 are measured by respective thermosensors 102, 108. An inlet gas analyser 104 and an outlet gas analyser 106 are used to analyse concentration of test material in the gas upstream and downstream of the exhaust component 2.

Figure 8:
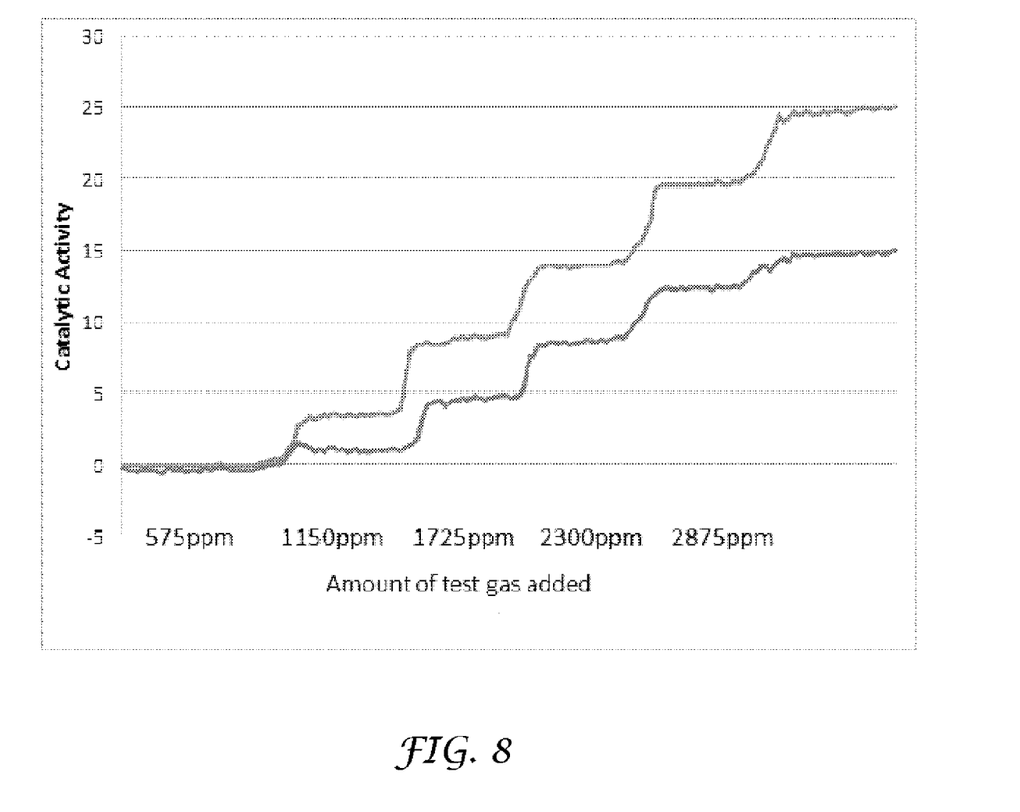
FIGS. 8 and 9 show results for testing with the test cell of FIG. 7.

As shown in FIG. 8, adding increasing amounts of test gas (in this example, butane) to a given filter at a given initial temperature shows a direct correlation between the measurement of the test gas and the catalytic activity (determined from temperature change). The upper line is for a filter with higher catalytic activity and the lower line is for a filter with lower catalytic activity. The method permits a rapid and easy test for catalyst efficiency without the use of an engine. Test results were also obtained for propane, which were very similar to the results for butane. The energy liberated during the conversion of propane (2220 kg/mol) is slightly less than butane (2878 kg/mol) but propane has a slightly higher light-off temperature, enabling the testing temperature to be raised up to 450° C.

Figure 9:
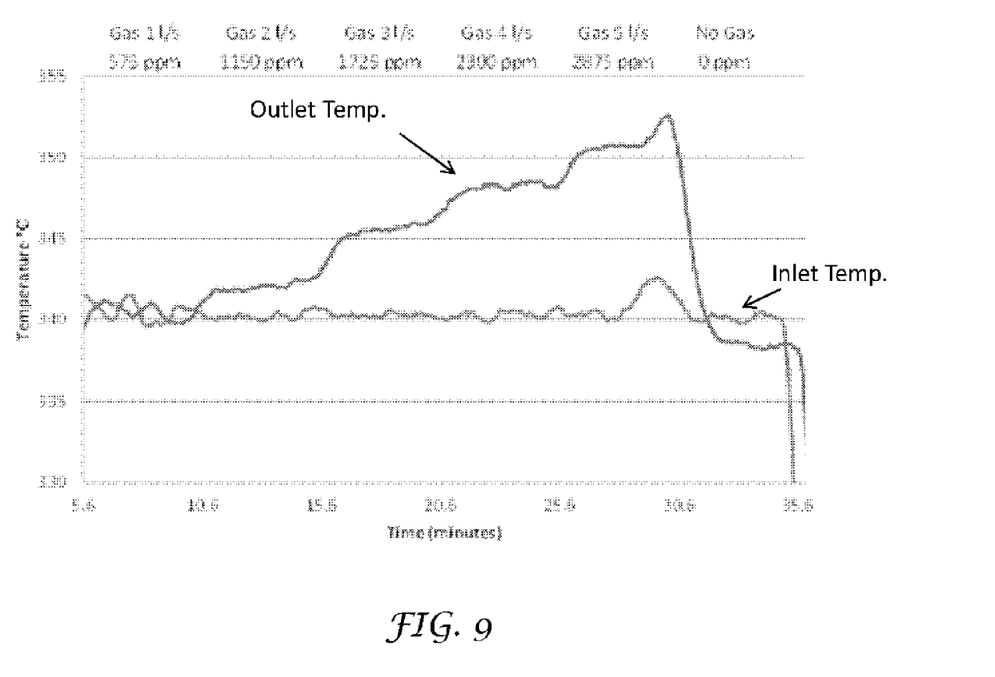

In FIG. 9, results are shown for inlet and outlet temperatures for a filter with catalytic activity. The test gas used was butane. After about five minutes the inlet temperature remained substantially constant at about 340° C. The outlet temperature increased with increasing concentration of butane before rapidly falling when the butane was removed from the gas stream.

Figure 10:
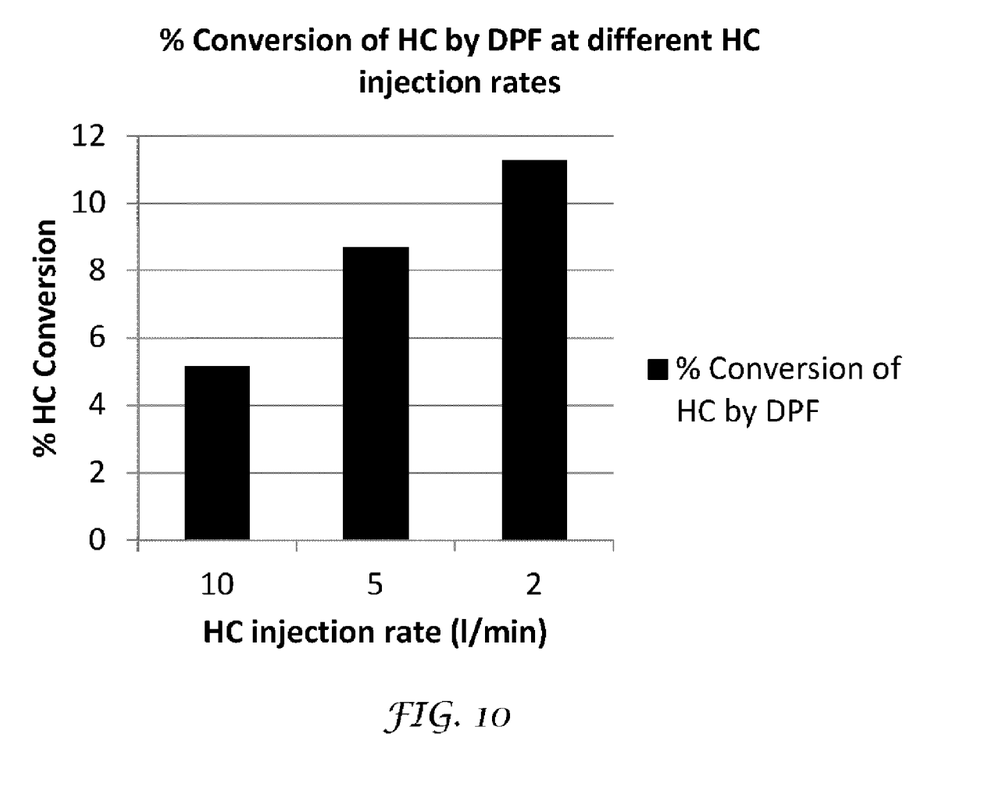
FIG. 10 is a graph showing conversion of hydrocarbons at different injection rates for a given DPF.

FIG. 10 shows percentage conversion of hydrocarbons by a commercial DPF (9.5"/241 mm) at different injection rates. The DPF was maintained at a temperature of 350° C. Lower injection rates produce higher percentage conversion of the hydrocarbon.

Figure 11:
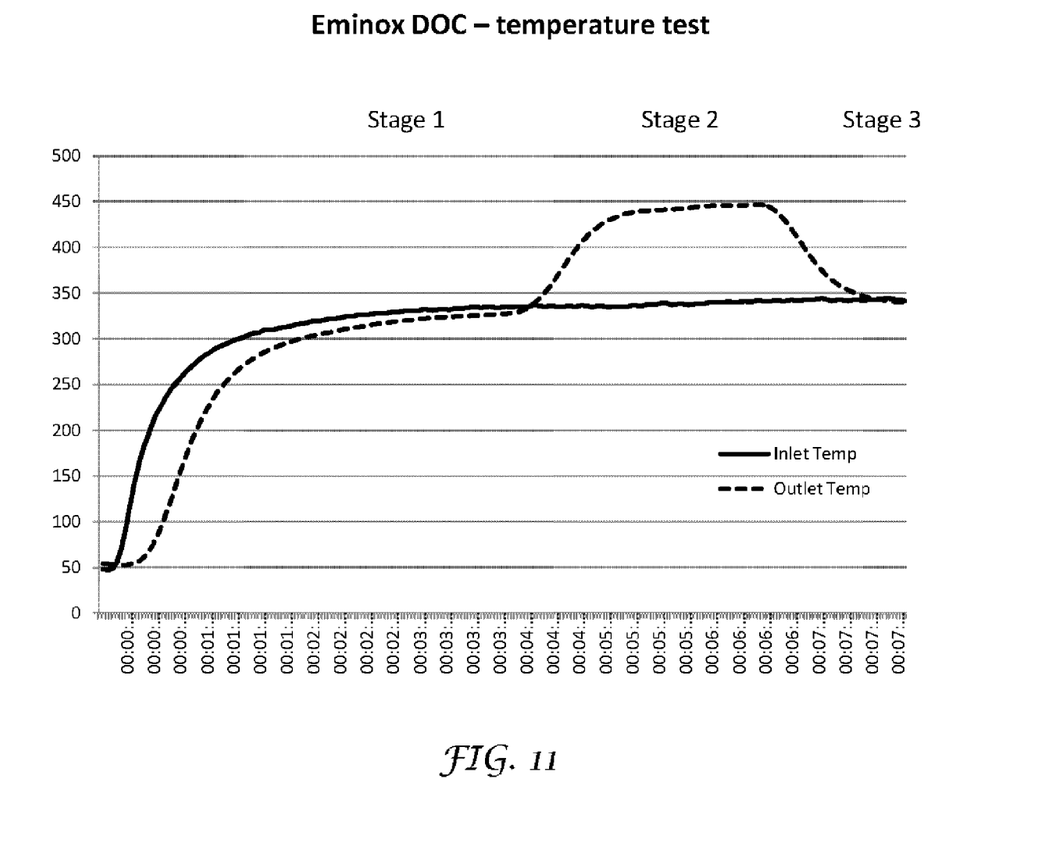
FIGS. 11-12 show results for further tests of filters in accordance with an aspect of the invention.

The graph in FIG. 11 shows the change in temperature for a Diesel Oxidation Catalyst (Eminox DOC) while a heated exhaust gas is passed through a restricted area of the catalyst. In this example, the exhaust gas was a stream of hot air; during Stage 2, propane was injected into the hot air stream, upstream of the catalyst. The measured temperature increased from below 350° C. to almost 450° C. Thus, the use of a restricted area does not prevent a substantial temperature increase which can be related to catalytic efficiency of the whole catalyst.

Figure 12:
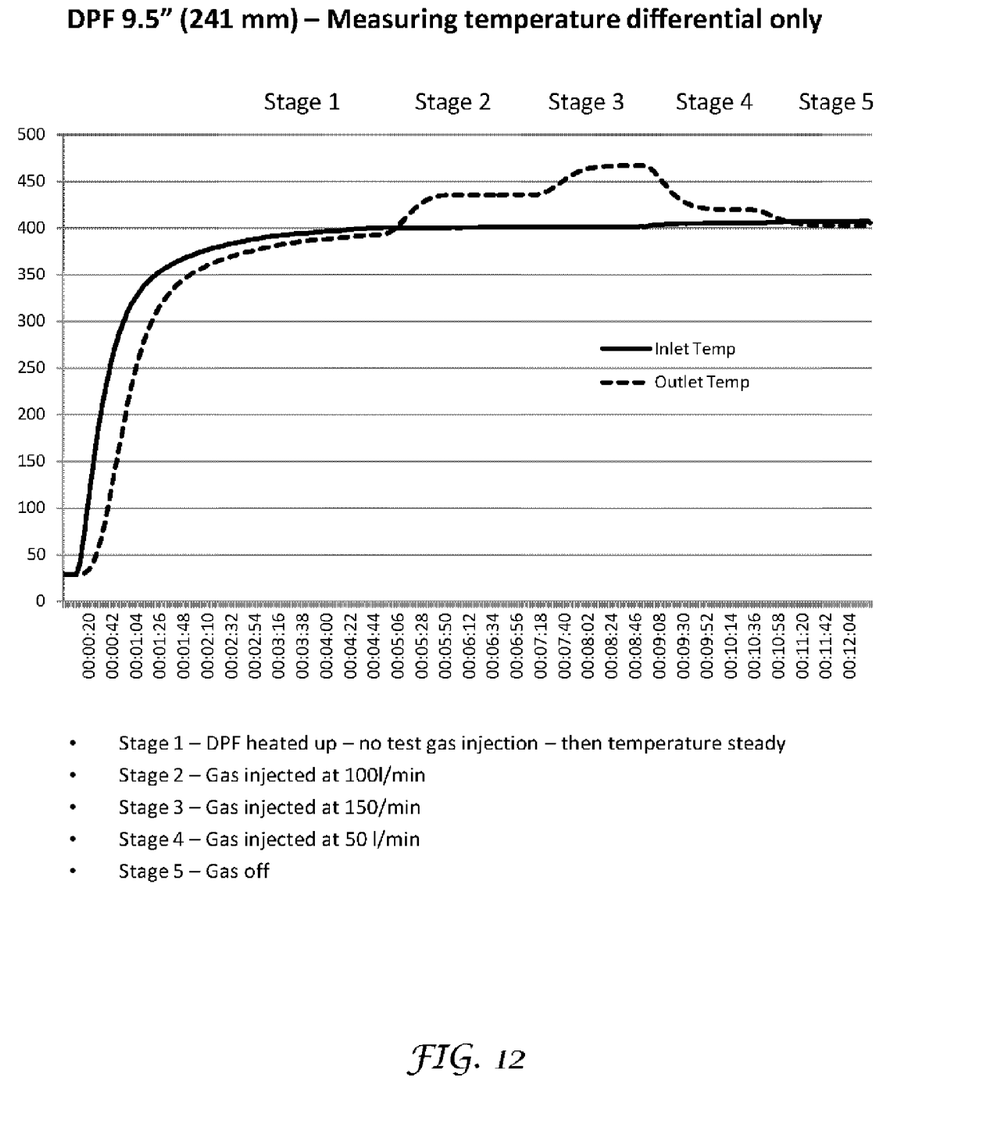

In FIG. 12, the hot air stream at 400° C. initially (Stage 1) had no injected hydrocarbon. Injection of propane at 100 l/min (Stage 2) produced a significant rise in outlet temperature, and injection at 150 l/min (Stage 3) further increased the outlet temperature. A reduction to 50 l/min (Stage 4) reduced the outlet temperature, and when the propane injection ceased (Stage 5) the outlet temperature dropped again to the same value as the inlet temperature, consistent with there being no hydrocarbon oxidation.

Figure 13:
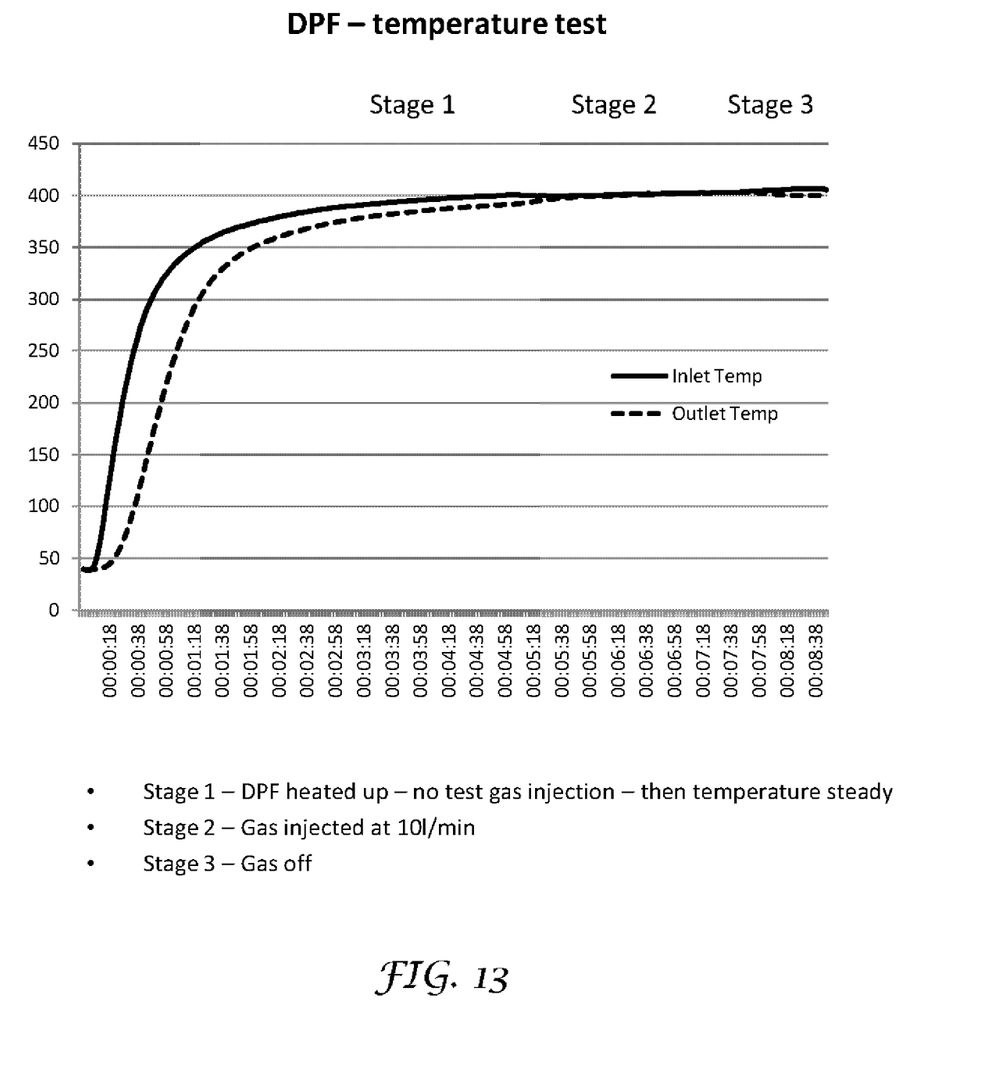
FIG. 13 shows a corresponding test result for a filter with a catalyst that does not oxidise hydrocarbons.

In contrast, the graphs in FIG. 13 show no substantial difference between inlet and outlet temperatures for a DPF in which propane was injected, indicating that the DPF being tested does not include a catalyst that oxidises hydrocarbons.

The present invention provides an apparatus and method for testing exhaust components, which improves speed and efficiency. The invention provides a rapid QC test for catalytic efficiency which may be used on exhaust components such as diesel particulate filters, notably after cleaning. The test may provide a 'pass-fail' outcome within about five minutes and without the need for an engine to be used. Appropriate space velocity, and operating/catalytic temperatures of over 250° C., notably over 300° C., may readily be achieved in a cost-effective manner.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. A method of testing the catalytic efficiency of an exhaust component when it has been removed from a vehicle, the exhaust component having a plurality of elongate channels through which exhaust gases flow, said channels extending between a first end face and a second end face of said component, and the method comprising:
- applying a first sealing means to said first end face of the exhaust component and applying a second sealing means to said second end face of the exhaust component, such that said first and second sealing means create a gas-tight seal and prevent exhaust gas flowing through a plurality of the channels of the exhaust component;
- causing an exhaust gas to flow through the exhaust component; and
- making measurements of a property of the exhaust gas before and after it has flowed through said exhaust component;

wherein the flow of the exhaust gas through the channels is restricted by said first sealing means and said second sealing means such that the volume of the exhaust component through which the exhaust gas flows is reduced.

2. A method as claimed in claim 1, wherein the volume of the exhaust component through which the exhaust gas flows is less than 50%.

3. A method as claimed in claim 1, wherein the volume of the exhaust component through which the exhaust gas flows is between 15% and 30%.

4. A method as claimed in claim 1, wherein the volume of the exhaust component through which the gas flows is centrally located in the exhaust component such that gas does not flow through a peripheral region of the exhaust component.

5. A method as claimed in claim 1, wherein the first sealing means comprises a first sealing plate and the second sealing means comprises a second sealing plate, and wherein the method further comprises clamping the exhaust component between said first and second sealing plates.

6. A method as claimed in claim 1, wherein the exhaust component is a particulate filter.

7. A method as claimed in claim 1, wherein the method comprises pre-heating the exhaust gas before it flows through the exhaust component.

8. A method as claimed in claim 1, wherein the method comprises heating said exhaust component.

9. A method as claimed in claim 1, wherein the step of causing an exhaust gas to flow through the exhaust component comprises providing a stream of heated gas to an inlet of the exhaust component, the heated gas containing a material which is acted upon by a catalyst in the exhaust component.

10. A method as claimed in claim 9, wherein said material is injected into the heated gas upstream of the exhaust component.

11. A method as claimed in claim 9, wherein said material is nitric oxide, carbon monoxide, a hydrocarbon or a mixture of at least some of these gases.

12. An apparatus for use in the method of claim 1, for testing the catalytic efficiency of an exhaust component, the exhaust component having a plurality of elongate channels through which exhaust gases flow, said channels extending between a first end face and a second end face of said component, and the apparatus comprising:
- a first clamping means and a second clamping means, each of said first and second clamping means comprising a sealing plate including an aperture for receiving an end of a conduit through which exhaust gas is conveyed;
- a conduit in said aperture and connected to a source of exhaust gas; and
- means for urging the first and second clamping means into a clamping position in which the sealing plate of the first clamping means is in contact with said first end face of the exhaust component and the sealing plate of the second clamping means is in contact with said second end face of the exhaust component, such that the apertures in the first and second sealing plates are aligned, thereby defining a gas flow path through said exhaust component between said apertures.

13. An apparatus as claimed in claim 12, wherein the sealing plates comprise a sealing layer made of a ceramic felt material.

14. An apparatus as claimed in claim 12, wherein the means for urging the first and second clamping means into a clamping position comprises pneumatic cylinders.

* * * * *